(12) United States Patent
Kitamura et al.

(10) Patent No.: US 8,465,644 B2
(45) Date of Patent: Jun. 18, 2013

(54) MEMBRANE ELEMENT IN IMMERSION TYPE MEMBRANE SEPARATION APPARATUS

(75) Inventors: Kotaro Kitamura, Tokyo (JP); Yasuyuki Okuno, Amagasaki (JP); Yusuke Okawa, Tokyo (JP); Hidemi Nagakawa, Amagasaki (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 276 days.

(21) Appl. No.: 12/732,374

(22) Filed: Mar. 26, 2010

(65) Prior Publication Data
US 2010/0243555 A1    Sep. 30, 2010

(30) Foreign Application Priority Data
Mar. 31, 2009    (JP) .................................. 2009-087394

(51) Int. Cl.
*B01D 63/08* (2006.01)

(52) U.S. Cl.
USPC .............. 210/321.6; 210/321.75; 210/321.84; 210/323.1; 210/340; 210/483; 210/486

(58) Field of Classification Search
USPC ............... 210/321.6, 321.61, 321.64, 321.72, 210/321.75, 321.84, 322, 323.1, 340, 346, 210/483, 486, 498
See application file for complete search history.

(56) References Cited

U.S. PATENT DOCUMENTS

| | | | |
|---|---|---|---|
| 2,568,990 A * | 9/1951 | Daniel .......................... | 210/637 |
| 7,056,440 B2 * | 6/2006 | Haney et al. .................. | 210/644 |
| 2004/0079692 A1 * | 4/2004 | Cote et al. ..................... | 210/220 |
| 2004/0226886 A1 * | 11/2004 | Hester et al. .................. | 210/649 |
| 2007/0215538 A1 * | 9/2007 | Periana et al. ............. | 210/321.6 |
| 2008/0197066 A1 * | 8/2008 | Connors .................. | 210/321.75 |
| 2010/0072130 A1 * | 3/2010 | Fane et al. ..................... | 210/605 |
| 2010/0096317 A1 * | 4/2010 | Morita ..................... | 210/321.84 |

FOREIGN PATENT DOCUMENTS

JP    2008-246356    10/2008

* cited by examiner

*Primary Examiner* — John Kim
(74) *Attorney, Agent, or Firm* — Antonelli, Terry, Stout & Kraus, LLP.

(57) ABSTRACT

To present a membrane element in an immersion type membrane separation apparatus capable of filtering efficiently by holding a uniform filtering capacity on the whole of the membrane surface if clogging occurs in a part of the membrane surface. The membrane element A is composed of a filtration chamber forming part C arrayed by dividing filtration chambers into a plurality in a vertical direction, water collecting transverse groove forming parts B forming transverse grooves (4) for collecting filtered water from each filtration chamber in a lateral direction by connecting with the filtration chamber forming part C, and a water collecting route (10) by connecting with the water collecting transverse groove forming parts B for collecting the water flaker in the lateral direction from each transverse groove (4) and discharging to outside.

15 Claims, 7 Drawing Sheets

MEMBRANE ELEMENT IN IMMERSION TYPE MEMBRANE SEPARATION APPARATUS

TECHNICAL FIELD

The present invention relates to a membrane element in an immersion type membrane separation apparatus, and more particularly to a membrane element in an immersion type membrane separation apparatus designed to filter uniformly along the entire membrane surface of the membrane elements disposed adjacently in parallel, and to collect water efficiently by decreasing the pressure loss.

BACKGROUND ART

Conventionally, a membrane separation active sludge treating method has been known as a method of treating wastewater (water to be treated) such as sewage, industrial wastewater, household wastewater and others.

Figure 7:
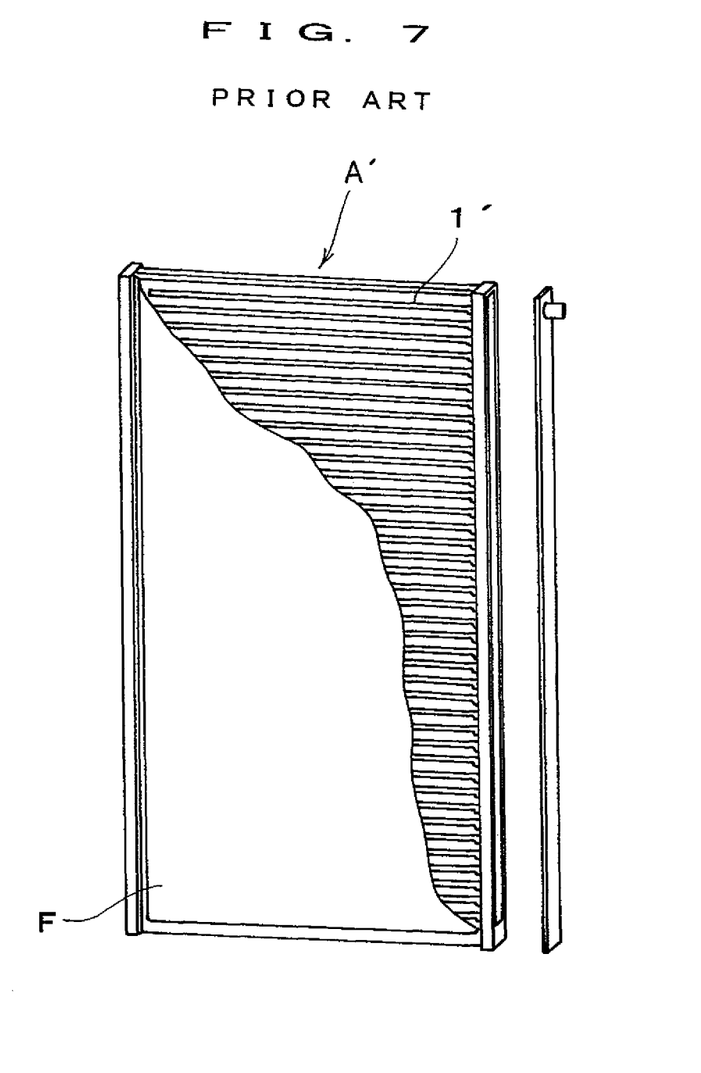
FIG. 7 is an explanatory diagram of a membrane element in an immersion type membrane separation apparatus in a prior art.

In this membrane separation active sludge treating method, an immersion type membrane separation apparatus is immersed and installed in a reaction tank for treating wastewater by active sludge treatment. This immersion type membrane separation apparatus is composed by disposing a plurality of membrane elements A' of organic flat membrane type in parallel at specified intervals in a main body casing as shown in FIG. 7, and by disposing the surfaces of filtration membranes F along the vertical direction to fill. The wastewater is sucked and filtered by making use of a negative pressure (inter-membrane differential pressure) generated in the membrane elements A' from the surfaces of filtration membranes F between membrane elements A', and the filtered water is taken out as a treated water.

Moreover, an aeration device is disposed in the bottom of the reaction tank at a lower position from the immersion type membrane separation apparatus immersed in the reaction tank, and the membrane elements disposed hi parallel are agitated within the tank by generating an ascending stream in the wastewater by elevating a membrane cleaning gas (generally, air), so that the surface of the membrane elements may be cleaned.

However, the conventional membrane elements A' are long and rectangular in shape, and are composed by merely bonding the peripheral edges of the filtration membranes F to the surface of a membrane element main body part 1', and when a suction pressure or feeding pressure is applied to the filtration membranes F at the time of filtering or chemical cleaning, the filtration membranes F may be loosened or deviated, and the adjacent filtration membranes F may contact with each other when the filtration membranes F are disposed oppositely, and filtering or chemical cleaning may not be carried out uniformly along the entire surface of the filtration membranes F, and the efficiency of filtering or chemical cleaning may be lowered.

Moreover, the bonding force of the filtration membranes F to the surface of the membrane element main body part 1' is limited, and it is difficult to raise the flow velocity at the time of filtering or chemical cleaning.

This problem is a bottleneck for increasing the size of (increasing the surface area of) the membrane elements A'.

Moreover, the conventional membrane elements A' are generally long and rectangular in shape, and are designed to such the wastewater (water to be treated) in the reaction tank by the entire membrane surface, and therefore, at the time of suction, the suction pressure may be deviated on the entire membrane surface, and the wastewater may not be filtered efficiently.

To solve this problem, a route of filtered water is formed by cutting a recess or a groove in the membrane surface, but since only one discharge port is provided to discharge water, at the time of suction of wastewater, its suction pressure is concentrated around the discharge port, and at the time of sucking and filtering, the suction force is concentrated in a portion closer to the discharge port, and, as a result, uniform filtering on the entire membrane surface is not realized.

In the invention as disclosed in patent document 1, by varying the coefficient of resistance of the liquid collecting portion and the liquid passing route, for example, the coefficient of resistance of the route network in an immediate region contacting with the liquid collecting portion is set smaller than the coefficient of resistance of the route network remoter from the immediate region, or the coefficient of resistance is decreased in the route network closer to the liquid collecting portion, sequentially or at gradual steps or intermittently, so that a uniform filtering may be realized on the entire membrane element surface.

However, in the configuration disclosed in patent document 1, same as in the membrane elements shown in FIG. 7, since the inside of the membrane element is not divided, but is used as one whole membrane surface, if clogging occurs in a part of the membrane surface, the suction amount is changed by this clogging, and the predetermined coefficient of resistance of the entire membrane surface is changed, and uniform filtering cannot be executed as specified.

[Prior Art Literature]
[Patent Document]
Patent document 1: Japanese Patent Application Laid-Open No. 2008-246356

SUMMARY OF THE INVENTION

Problems to be Solved by the Invention

The present invention is devised to solve the problems of the membrane elements in the immersion type membrane separation apparatus, and it is hence a primary object thereof to present a membrane element capable of filtering and cleaning with chemicals uniformly over the entire surface of the filtration membrane, and capable of raising the flow velocity in filtering and chemical cleaning, thereby enhancing the efficiency of filtering and chemical cleaning.

It is a secondary object of the invention to present a membrane member in an immersion type membrane separation apparatus capable of filtering efficiently by holding a uniform filtering capacity on the whole of the membrane surface if clogging occurs in a part of the membrane surface.

Means for Solving the Problems

To achieve the primary object, the membrane element in the immersion type membrane separation apparatus of the invention is a membrane element of an immersion type membrane separation apparatus composed by bonding a peripheral edge of a filtration membrane to at least one surface of a membrane element main body part for filtering, the water to be treated by the filtration membrane, in which the filtration membrane is bonded linearly to the bonded surface of the membrane sheet of the membrane element main body, and a bonded portion is formed in a lateral direction dividing vertically the inner side of the bonded peripheral edge of the filtration membrane.

To achieve the secondary object, in the membrane element in the immersion type membrane separation apparatus of the invention, the membrane element is composed of a filtration chamber forming part arrayed by dividing filtration chambers into a plurality in a vertical direction, water collecting transverse groove forming parts forming transverse grooves for collecting filtered water from each filtration chamber in a lateral direction by connecting with the filtration chamber forming part, and a water collecting route by connecting with the water collecting transverse groove forming parts for collecting the water further in the lateral direction from each transverse groove and discharging to outside.

In this case, in each filtration chamber of the filtration chamber forming part, embosses are formed so that water collection may be uniform in the lateral direction in the filtration chambers.

The embosses formed in each filtration chamber are arrayed so that the passing resistance may be smaller as going remoter from the vicinity of the water collecting transverse groove forming parts.

Each filtration chamber of the filtration chamber forming part is set in the surface area so that the passing resistance from each filtration chamber into the water collecting route may be smaller as going remoter from the vicinity of the discharge port.

The filtration chambers formed in the filtration chamber forming part are formed at specific intervals of a plurality of partition walls for dividing vertically on the surface of the membrane element.

The transverse grooves formed in the water collecting transverse groove forming part to communicate with each filtration chamber are formed to be smaller in the interval or larger in the groove sectional area as going remoter from the vicinity of the discharge port.

Effects of the Invention

According to the membrane element in the immersion type membrane separation apparatus of the invention, in a membrane element of an immersion type membrane separation apparatus composed by bonding a peripheral edge of a filtration membrane to at least one surface of a membrane element main body part for filtering the water to be treated by the filtration membrane, the filtration membrane is bonded linearly to the bonded surface of the membrane sheet of the membrane element main body, and a bonded portion is formed in a lateral direction dividing vertically the inner side of the bonded peripheral edge of the filtration membrane, and therefore the bond strength of the filtration membrane can be increased by the bonding portion in the lateral direction, and the magnitude of the tension of the filtration film may be made uniform on the whole surface of the filtration membrane.

As a result, filtering or chemical cleaning can be executed uniformly on the entire surface of the filtration membrane, and the flow velocity in the process of filtering or chemical cleaning can be raised, and at the same time the efficiency of filtering or chemical cleaning can be enhanced, and the membrane element can be increased in size (increased in the surface area).

Moreover, since the magnitude of the tension of the filtration film cab be made uniform on the whole surface of the filtration membrane, looseness or deviation of the filtration membrane can be prevented, and it is possible to prevent abrasion of the filtration membranes due to contact between adjacent filtration membranes when the filtration membranes are disposed oppositely.

The membrane element is composed of a filtration chamber forming part arrayed by dividing filtration chambers into a plurality in a vertical direction, water collecting transverse groove forming parts forming transverse grooves for collecting filtered water from each filtration chamber in a lateral direction by connecting with the filtration chamber forming part, and a water collecting route by connecting with the water collecting transverse groove forming parts for collecting the water further in the lateral direction from each transverse groove and discharging to outside, and therefore since water is collected independently from each filtration chamber divided into a plurality, a specific route can be assured from each filtration chamber into the water collecting route, and further by dividing the filtration chamber, it is possible to increase the area of gaps between the membrane surface and the membrane element, and efficient water collecting is realized, and uniform filtering is possible on the entire surface of the membrane element.

Further, in each filtration chamber of the filtration chamber forming part, embosses are formed so that water collection may be uniform in the lateral direction in the filtration chambers, and therefore uniform filtering is possible on the entire surface of the membrane element in a simple configuration.

The embosses formed in each filtration chamber are arrayed so that the passing resistance may be smaller as going remoter from the vicinity of the water collecting transverse groove forming parts, and therefore since the pressure is uniform by water collecting pressure, the water can be collected uniformly also from the inner parts of the membrane surface.

Each filtration chamber of the filtration chamber forming part is set in the surface area so that the passing resistance from each filtration chamber into the water collecting route may be smaller as going remoter from the vicinity of the discharge port, and therefore the water can be sucked uniformly from each filtration chamber in the filtration chamber close to the discharge port and in the filtration chamber remote therefrom, and uniform filtering is possible on the entire surface of the membrane element.

The filtration chambers formed in the filtration chamber forming part are formed at specific intervals of a plurality of partition walls for dividing vertically on the surface of the membrane element, and therefore since the filtration chambers are individually independent, if clogging occurs in a part of the filtration chambers, efficient filtering and water collecting may be realized on the whole.

The transverse grooves formed in the water collecting transverse groove forming part to communicate with each filtration chamber are formed to be smaller in the interval or larger in the groove sectional area as going remoter from the vicinity of the discharge port, and therefore since the portion remoter from the discharge port is larger in the degree of concentration or the sectional area of the water collecting transverse grooves than in the closer portion, uniform filtering is realized on the entire surface of the membrane element.

EMBODIMENTS OF THE INVENTION

Embodiments of the membrane element in the immersion type membrane separation apparatus of the invention are described below by reference to the accompanying drawings.

Figure 1:
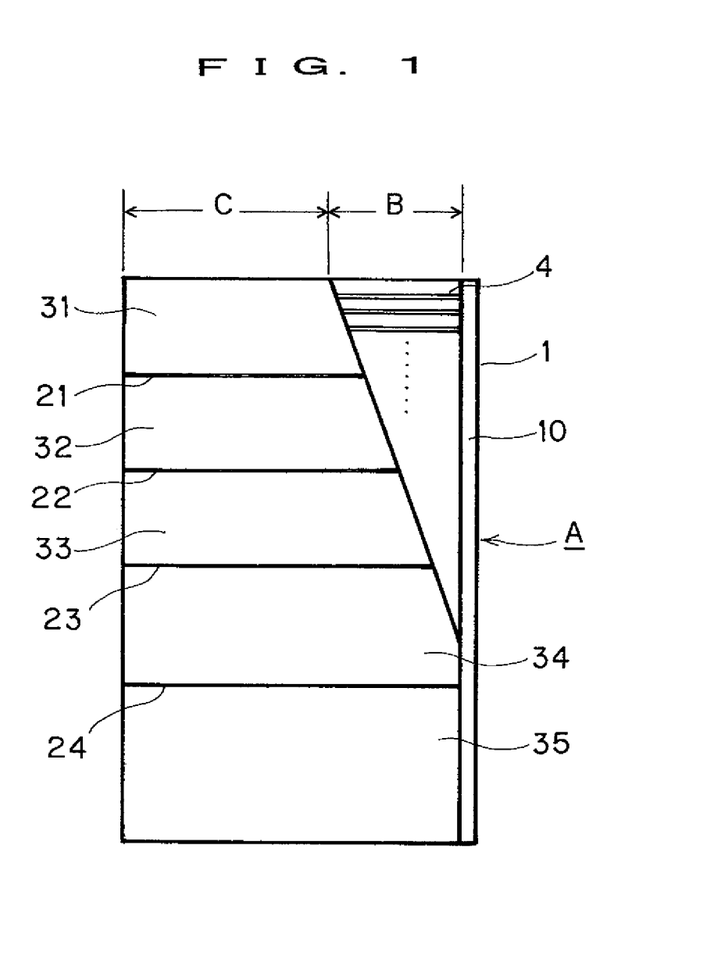
FIG. 1 is a front view showing a first embodiment of a membrane element in an immersion type membrane separation apparatus of the invention.
Figure 2:
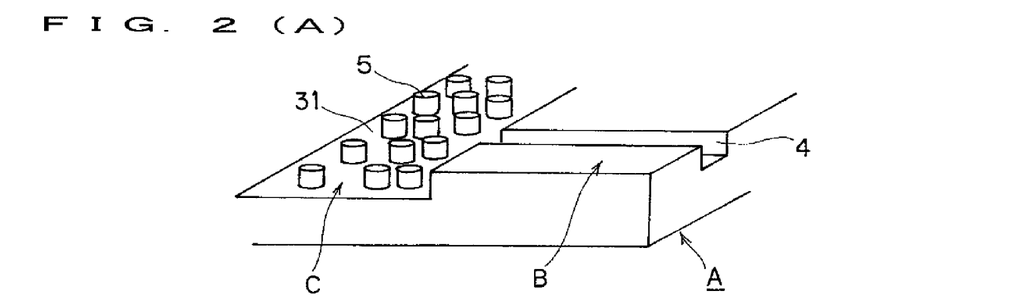
FIG. 2 is a magnified perspective view of parts of the membrane element, in which (A) shows a connection part of filtration chamber and transverse groove, (B) shows a connection part of transverse groove of water collecting transverse groove forming part and water collecting route, (C) shows a connection part of filtration chamber in partition wall part and transverse groove, and (D) shows a connection part of filtration chamber in the lowest stage in FIG. 1 and water collecting route.

FIG. 1 and FIG. 2 show a first embodiment of the membrane cartridge in the immersion type membrane separation apparatus of the invention.

When treating wastewater, such as sewage, industrial wastewater or domestic wastewater by using a membrane separation active sludge treating method, an immersion type membrane separation apparatus is immersed and disposed in a reaction tank (not shown), and an aeration device (not shown) is disposed in the bottom in the reaction tank, at a downward position of the immersion type membrane separation apparatus, for ejecting bubbles of membrane cleaning gas.

The filtration unit of this immersion type membrane separation apparatus is composed of a plurality of membrane elements A (also called flat membrane elements) disposed in parallel, which are assembled as one body in the membrane unit (not shown) so as to be coupled with each other.

This membrane element A is formed to apply a negative pressure in a liquid passing route (not shown) formed between a filtration membrane (not shown) disposed on the surface of a membrane element main body part 1 as the filter plate main body and the surface of the membrane element main body 1, and by making use of this negative pressure, the wastewater in the passage formed between the membrane elements is sucked and filtered.

The membrane element A is not particularly specified, but for example, as shown in FIG. 1, the membrane element A made of a synthetic resin is formed in a long rectangular shape, and this membrane element A is composed of a filtration chamber forming part C arrayed by dividing filtration chambers 31 to 35 into a plurality of stages in a vertical direction by partition walls 21 to 24, water collecting transverse groove forming parts B forming transverse grooves 4 for collecting filtered water from each filtration chamber in a lateral direction by connecting with each filtration chamber of the filtration chamber forming part C, and a water collecting route 10 by connecting with the water collecting transverse groove forming parts B for collecting the water further in the lateral direction from each transverse groove 4 and discharging to outside.

Herein, the filtration membrane is bonded linearly to the membrane element A at its peripheral edge and at the forming positions of the partition walls 21 to 24 of the membrane element A, so that a filtration chamber may be formed between the filtration membrane and the membrane element A.

More specifically, the material for composing the membrane element main body 1 is preferably a thermoplastic resin having a laser absorbing property, and is more preferably an ABS resin containing carbon black.

Accordingly, a laser bonding method may be applied to bonding to the membrane element main body part 1 of the filtration member composed of a water permeable material and capable of treating the wastewater by solid-liquid separation process.

The bonding method to the membrane element main body part 1 of the filtration member is not limited to this method alone, and any other method may be applied such as heating or other fusing method, or adhering method by using an adhesive agent, as far as the bonding portions of peripheral edges of the filtration membrane and partition walls 21 to 24 may be bonded linearly.

The filtration chamber forming part C is divided into a plurality, for example, five filtration chambers 31, 32, 33, 34, 35, although not specified, as shown in FIG. 1, by means of partition walls 21, 22, 23, 24 for dividing among the filtration chambers so as to be arrayed in plural stages in a vertical direction, so that the filtered water may not communicate with each other between upper and lower filtration chambers.

In this case, the filtration chambers 31, 32, 33, 34, 35 in each stage may be formed in a same width or same surface area in the vertical direction, but in the embodiment shown in FIG. 1, the passing resistance from each filtration chamber of the water collecting route 10 is set smaller as going remoter from the vicinity of the discharge port 7.

This is not particularly specified, but, for example, the chambers are disposed so that the filtration chamber remoter from the filtration chamber closer to the discharge port 7 may be progressively larger in the width or wider in the area in the vertical direction.

As a result, in the filtration chamber closer to the discharge port 7 and in the filtration chamber at the remoter side, water can be sucked uniformly from each filtration chamber, so that a uniform filtration is realized on the entire surface of the membrane element.

The width of the filtration chambers 31, 32, 33, 34, 35 in the vertical direction may be set freely, for example, in a range of 100 to 300 mm, and in this embodiment, it is set at 112 mm, 112 mm, 112 mm, 127 mm, and 135 mm sequentially from the top.

The width of the partition walls 21 to 24 at the bonding part with the filtration membranes in the vertical direction may be set freely, for example, in a range of about 5 to 30 mm, and it is set at 10 mm in this embodiment.

The filtration chambers 31, 32, 33, 34, 35 for composing the filtration chamber forming part C are provided with a multiplicity of embosses 5 (protrusions) as shown in FIG. 2, neatly or randomly, and the treated water in the filtration chambers filtered in each filtration chamber may flow into the transverse grooves 4 for collecting water disposed in the lateral direction uniformly on the whole in the filtration chambers.

These embosses 5 are different in density in each filtration chamber, that is, the passing resistance is set smaller as going remoter from the vicinity of the forming part of the transverse grooves for collecting water, for example, the density becomes higher by disposing properly. As a result, the water collecting pressure is uniform in the filtration chambers, and water can be collected uniformly from the inner parts of the membrane surface.

The dimension of the embosses 5 in the height direction is set in a range of, for example, about 0.4 to 0.9 mm, and the dimension of the transverse grooves 4 in the depth direction is set in a range of, for example, about 04 to 0.9 mm, and the dimension of the transverse grooves 4 in the width direction is set in a range of, for example, about 1.0 to 3.0 mm.

Figure 3:
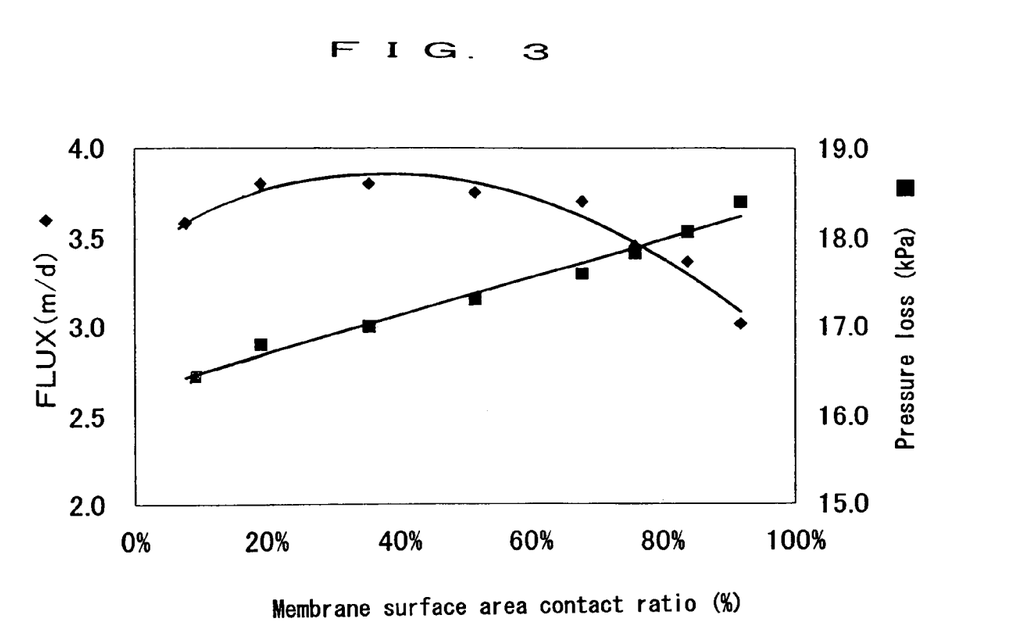
FIG. 3 is a graph showing test results for leading out the rate of the area of forming embosses occupying in the entire area of the filtration chamber forming part.

The rate of the forming area of the embosses 5 in the overall area of the filtration chamber forming part C is preferred to be set in a range of about 10 to 40%, as a result of tests as shown in FIG. 3.

The water collecting transverse groove forming part B is disposed adjacently to the filtration chamber forming part C as shown in FIG. 1, and is formed in a triangular shape so that the width may be smaller gradually as going remoter (to the lower end) from the vicinity (the upper end) of the discharge port. The water collecting transverse groove forming part B is formed to communicate with one or a plurality of transverse grooves 4 in each filtration chamber. In this case, as going remoter from the vicinity of the discharge port, the internal is set smaller, or the groove sectional area is increased. As a result, the density or the sectional area of the water collecting transverse grooves 4 is larger in the portion remoter from the discharge port 7 than in the closer portion, so that uniform filtering is realized on the entire surface of the membrane element.

The relation between the transverse grooves 4 communicating with each filtration chamber and the filtration chambers is shown in FIG. 2 (A), the relation with the water collecting route 10 communicating with the transverse grooves is shown in FIG. 2 (B), the relation between the partition walls for dividing the filtration chambers and the transverse grooves is shown in FIG. 2 (C), and the relation between the filtration chambers 35 and the water collecting route 10 in the portion not forming the water collecting transverse groove forming part B is shown in FIG. 2 (D).

The dimension of the water collecting route 10 in the depth direction is set freely in a range of, for example, about 0.5 to 1.0 mm, and the dimension of the water collecting route 10 in the width direction is set freely in a range of, for example, about 5 to 10 mm.

As described herein, in the membrane element of the invention, in the vertical direction of the filtration chamber forming part, the filtration chambers are divided into a plurality by partition walls and arranged in the vertical direction, and in the water collecting transverse groove forming part communicating with the filtration chamber forming part, one end portion communicates with each filtration chamber, and other end portion communicates with the water collecting route, and thus the transverse grooves are formed to collect the filtered water from the filtration chambers in the lateral direction, and the water is sucked and collected independently from each filtration chamber divided into a plurality, and a specific route is assured from each filtration chamber to the water collecting route side, and uniform filtering can be performed securely in on the entire surface of the membrane element.

Moreover, embosses are formed in each filtration chamber so that the water may be collected uniformly in the lateral direction in the filtration chambers, and these embosses are arrayed so that the passing resistance may be smaller as going remoter from the vicinity of the water collecting transverse groove forming part, and further the area of each filtration chamber is set so that the passing resistance from each filtration chamber to the water collecting route may be smaller as going remoter from the vicinity of the discharge port, and synergetically, therefore, uniform filtering is realized more reliably on the entire surface of the membrane element.

In addition, on the surface of the membrane element, the filtration chambers are disposed at specific intervals by way of a plurality of partition walls dividing vertically, the filtration chambers are individually independent, and if clogging occurs in a part of the filtration chambers, an efficient water collection is realized on the whole.

Figure 4:
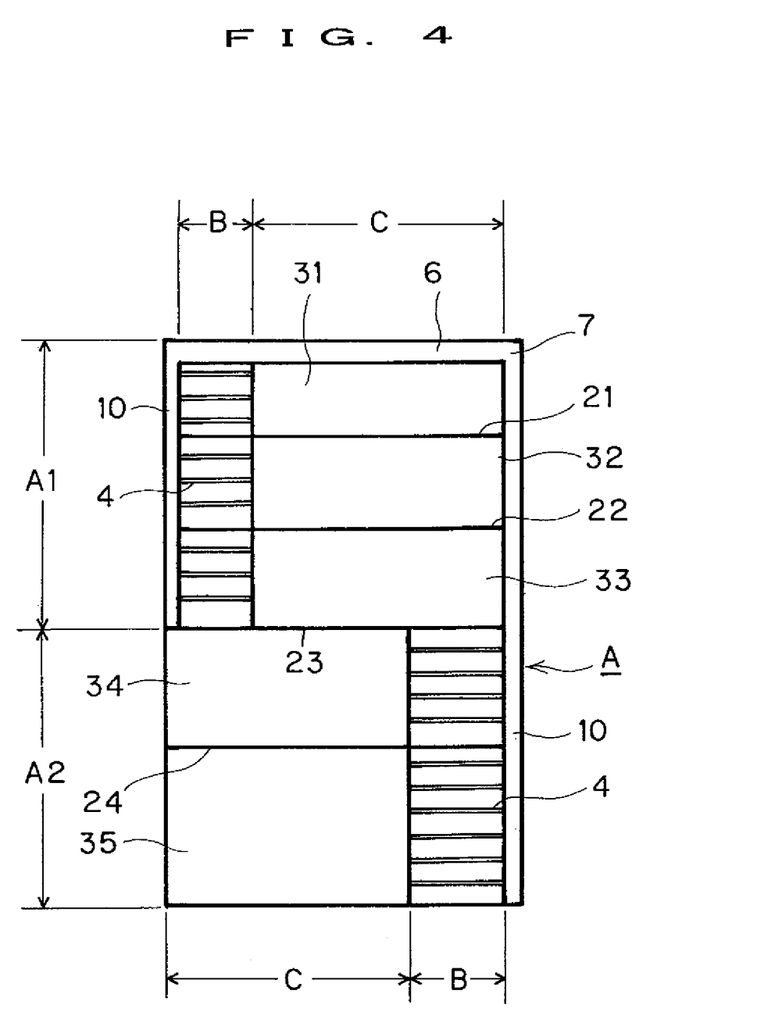
FIG. 4 is a front view showing a second embodiment of a membrane element in an immersion type membrane separation apparatus of the invention.

FIG. 4 shows a second embodiment of a membrane element in an immersion type membrane separation apparatus of the invention.

In this embodiment, a membrane element A is formed by disposing upper and lower membrane elements A1, A2 to be divided vertically, and from the left end of the upper membrane element A1, a water collecting route 10, a water collecting transverse groove forming part B, and a filtration chamber forming part C are disposed sequentially, and same as in the first embodiment, the water collecting route 10, the transverse grooves of the water collecting transverse groove forming part B, and the filtration chambers of the filtration chamber forming part C are connected with each other, and the filtered water is collected into the water collecting route 10 from each filtration chamber by way of the transverse grooves 4. The water collecting route 10 is formed in the longitudinal direction at the left end in the membrane element A1, and three filtration chambers 31, 32, 33 in the vertical direction are formed in the filtration chamber forming part C.

In the lower membrane element A2, upper and lower filtration chambers 34, 35 are formed, and the water collecting route 10 is disposed along the overall height of the membrane element A1 at its right end, and the water collecting transverse groove forming part B, and the filtration chamber forming part C are disposed to communicate with the water collecting route 10.

The upper end of the water collecting route 10 at the left end part of the upper membrane element A1 communicates with the water collecting route 10 of the lower membrane element A2 by way of a communication groove 6 formed at the upper end part of the membrane element A1, and therefore the filtered water flows individually filtered by the upper and lower membrane elements A1, A2 are gathered, and taken to the outside by way of the discharge port 7.

The other configuration and action of the second embodiment are same as in the first embodiment, and the detailed description is omitted.

Figure 5:
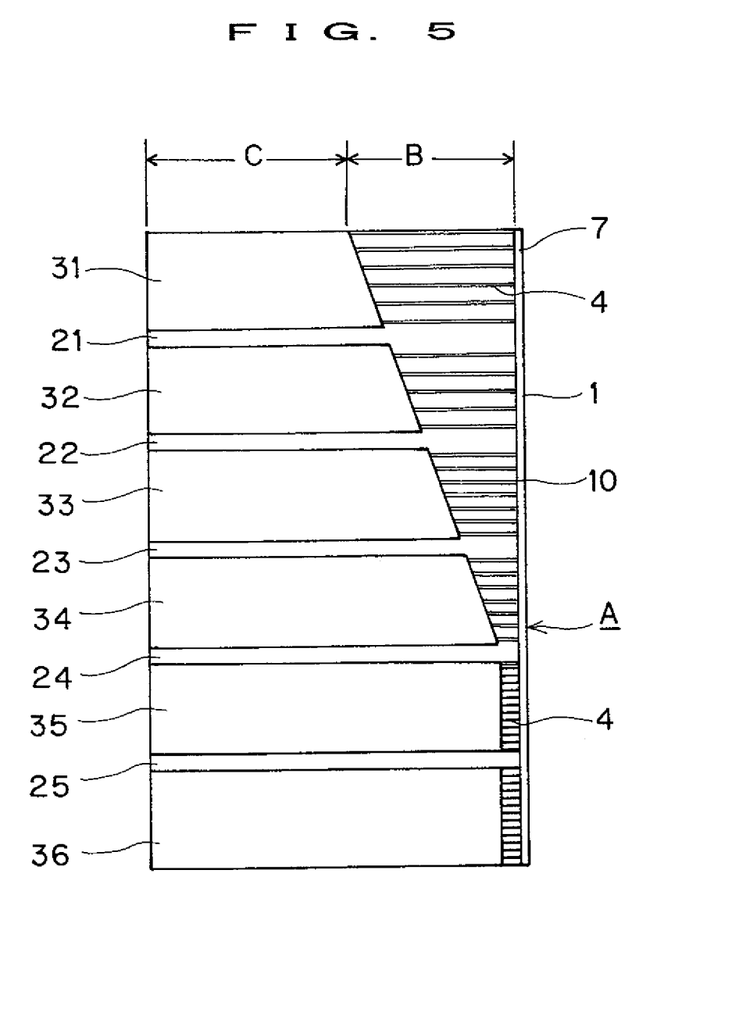
FIG. 5 is a front view showing a third embodiment of a membrane element in an immersion type membrane separation apparatus of the invention.

FIG. 5 shows a third embodiment of a membrane element in an immersion type membrane separation apparatus of the invention.

In this embodiment, same as in the first embodiment, in the lateral direction of a membrane element A, a filtration chamber forming part C, a water collecting transverse groove forming part B, and a water collecting route 10 are arrayed, filtration chambers 31 to 36 are arrayed and formed in upper and lower plural stages in the entire structure of the filtration chamber forming part C by way of partition walls 21 to 25, and these filtration chambers 31 to 36 are formed to communicate with the water collecting route 10 by way of transverse grooves 4 formed in the water collecting transverse groove forming part B.

In this case, the transverse grooves 4 are arrayed to communicate with all filtration chambers 31 to 36, but the length of the transverse grooves corresponding to the filtration chamber at a position remoter from a discharge port 7 is set to be shorter gradually. As a result, uniform filtering is possible on the entire surface of the membrane element.

The other configuration and action of the third embodiment are same as in the first embodiment, and the detailed description is omitted.

Figure 6:
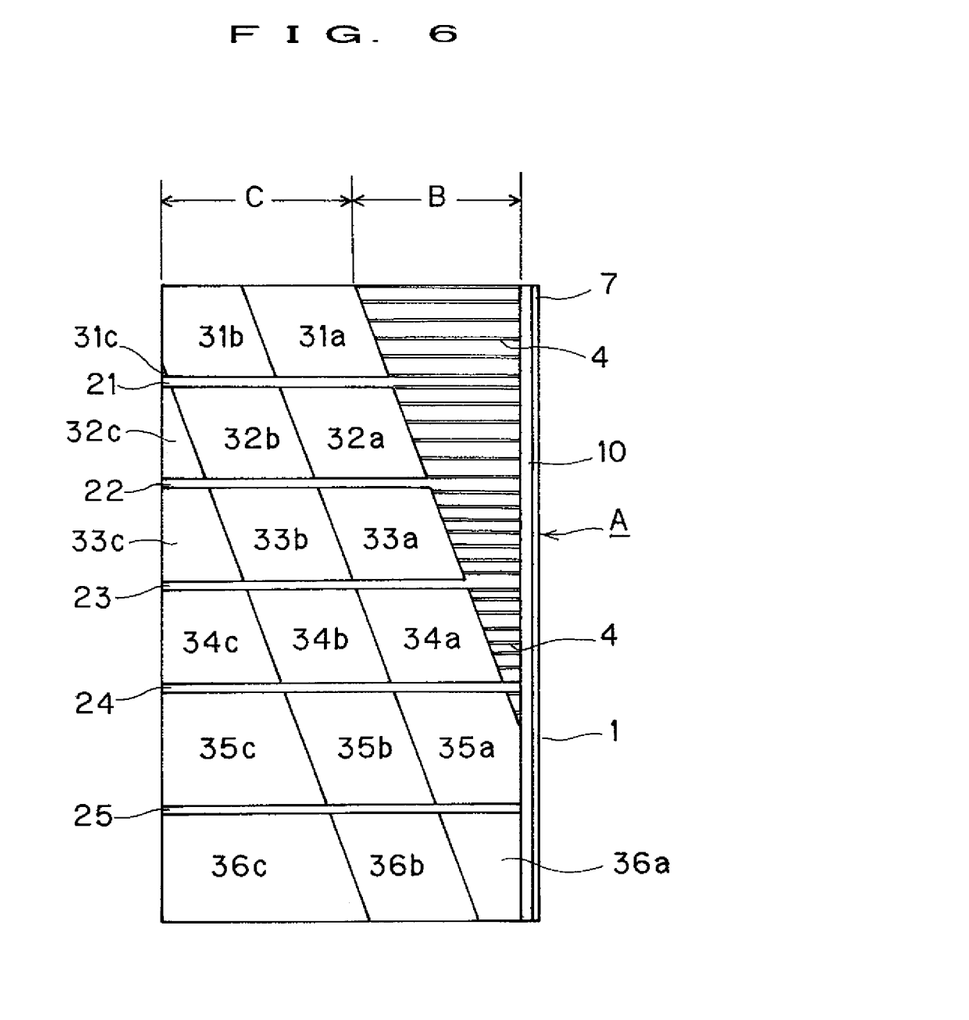
FIG. 6 is a front view showing a fourth embodiment of a membrane element in an immersion type membrane separation apparatus of the invention.

FIG. 6 shows a fourth embodiment of a membrane element in an immersion type membrane separation apparatus of the invention.

This embodiment is a modified example of the first embodiment, filtration chambers 31 to 36 are arrayed and formed in upper and lower plural stages in the entire structure of a filtration chamber forming part C by way of partition walls 21 to 25, and these filtration chambers 31 to 36 are provided with zones different in the density of embosses to be formed along a remoter direction from a water collecting route 10, for example, three zones 31a, 31b, 31c in the filtration chamber 31.

Thus, in the filtration chamber in each stage, the water sucked in the membrane element flows smoothly toward the water collecting route 10, which contributes to uniform filtering on the entire surface of the membrane element.

The other configuration and action of the fourth embodiment are same as in the first embodiment, and the detailed description is omitted.

The membrane element in the immersion type membrane separation apparatus of the invention is described herein by referring to plural embodiments, but it must be noted that the invention is not limited to the illustrated embodiments alone, but may be changed and modified within a scope not departing from the true spirit thereof, and the configurations mentioned in the embodiments may be properly combined.

INDUSTRIAL APPLICABILITY

The membrane element in the immersion type membrane separation apparatus of the invention is characterized by the feature of filtering uniformly and efficiently on the entire membrane surface of the membrane element in a simple configuration, and is therefore preferably usable in applications of the immersion type membrane separation apparatus.

DESCRIPTION OF REFERENCE NUMERALS

A Membrane element
A1 Upper membrane element
A2 Lower membrane element
B Water collecting transverse groove forming part
C Filtration chamber forming part
1 Membrane element main body part
10 Water collecting route
21-25 Partition wall
31-36 Filtration chamber
4 Transverse groove
5 Emboss
6 Communication groove
7 Discharge port

The invention claimed is:

1. A membrane element in the immersion type membrane separation apparatus, comprising:
a membrane element main body part comprising a filtration chamber forming part divided into a plurality of filtration chambers in a vertical direction by partition walls, water collecting transverse groove forming parts forming transverse grooves for collecting filtered water from each filtration chamber in a lateral direction by connecting with the filtration chambers, and a water collecting route by connecting with the water collecting transverse groove forming parts for collecting the water further in the lateral direction from each transverse groove and discharging to outside; and
a filtration membrane bonded linearly to at least one surface of the membrane element main body part at a peripheral edge and at the partition walls for filtering the water to be treated and for preventing filtered water from communicating between filtration chambers.

2. The membrane element in the immersion type membrane separation apparatus according to claim 1, wherein the transverse grooves formed in the water collecting transverse groove forming part to communicate with each filtration chamber are formed to be smaller in interval or larger in groove sectional area as going remoter from the vicinity of a discharge port of the membrane element.

3. A membrane element in an immersion type membrane separation apparatus, being a membrane element of an immersion type membrane separation apparatus composed by bonding a peripheral edge of a filtration membrane to at least one surface of a membrane element main body part for filtering the water to be treated by the filtration membrane, wherein the filtration membrane is bonded linearly to the bonded surface of the membrane sheet of the membrane element main body part, and a bonded portion is formed in a lateral direction dividing vertically the inner side of the bonded peripheral edge of the filtration membrane, wherein the membrane element comprises a filtration chamber forming part arrayed by dividing filtration chambers into a plurality in a vertical direction and each filtration chamber of the filtration chamber forming part is provided with embosses so that water collection may be uniform in the lateral direction in the filtration chambers.

4. The membrane element in the immersion type membrane separation apparatus according to claim 3, wherein the embosses formed in each filtration chamber are arrayed so that the passing resistance may be smaller as going remoter from the vicinity of water collecting transverse groove forming parts.

5. The membrane element in the immersion type membrane separation apparatus according to claim 4, wherein the membrane element further comprises water collecting transverse groove forming parts forming transverse grooves for collecting filtered water from each filtration chamber in a lateral direction by connecting with the filtration chamber forming part, and a water collecting route by connecting with the water collecting transverse groove forming parts for collecting the water further in the lateral direction from each transverse groove and discharging to outside.

6. The membrane element in the immersion type membrane separation apparatus according to claim 3, wherein the filtration chambers formed in the filtration chamber forming part are formed at specific intervals of a plurality of partition walls for dividing vertically on the surface of the membrane element.

7. The membrane element in the immersion type membrane separation apparatus according to claim 3, wherein the membrane element further comprises water collecting transverse groove forming parts forming transverse grooves for collecting filtered water from each filtration chamber in a lateral direction by connecting with the filtration chamber forming part, and a water collecting route by connecting with the water collecting transverse groove forming parts for collecting the water further in the lateral direction from each transverse groove and discharging to outside.

8. A membrane element in the immersion type membrane separation apparatus, comprising:
a membrane element main body part comprising a filtration chamber forming part divided into a plurality of filtration chambers in a vertical direction by partition walls, wherein each filtration chamber is provided with embosses so that water collection may be uniform in the lateral direction in the filtration chambers; and a filtration membrane bonded linearly to at least one surface of the membrane element main body part at a peripheral edge and at the partition walls for filtering the water to be treated and for preventing filtered water from communicating between filtration chambers.

9. The membrane element in the immersion type membrane separation apparatus according to claim 8, wherein the membrane element further comprises water collecting transverse groove forming parts forming transverse grooves for collecting filtered water from each filtration chamber in a lateral direction by connecting with the filtration chambers, and the embosses formed in each filtration chamber are arrayed so that the passing resistance may be smaller as going remoter from the vicinity of the water collecting transverse groove forming parts.

10. A membrane element in an immersion type membrane separation apparatus, being a membrane element of an immersion type membrane separation apparatus composed by bonding a peripheral edge of a filtration membrane to at least one surface of a membrane element main body part for filtering the water to be treated by the filtration membrane, wherein the filtration membrane is bonded linearly to the bonded surface of the membrane sheet of the membrane element main body part, and a bonded portion is formed in a lateral direction dividing vertically the inner side of the bonded peripheral edge of the filtration membrane, wherein the membrane element comprises a filtration chamber forming part arrayed by dividing filtration chambers into a plurality in a vertical direction and each filtration chamber of the filtration chamber forming part is set in the surface area so that the passing resistance from each filtration chamber into a water collecting route may be smaller as going remoter from the vicinity of a discharge port of the membrane element.

11. The membrane element in the immersion type membrane separation apparatus according to claim 10, wherein the filtration chambers formed in the filtration chamber forming part are formed at specific intervals of a plurality of partition walls for dividing vertically on the surface of the membrane element.

12. The membrane element in the immersion type membrane separation apparatus according to claim 10, wherein the membrane element further comprises water collecting transverse groove forming parts forming transverse grooves for collecting filtered water from each filtration chamber in a lateral direction by connecting with the filtration chamber forming part, and a water collecting route by connecting with the water collecting transverse groove forming parts for collecting the water further in the lateral direction from each transverse groove and discharging to outside.

13. A membrane element in the immersion type membrane separation, comprising:
a membrane element main body part comprising a filtration chamber forming part divided into a plurality of filtration chambers in a vertical direction by partition walls, wherein each filtration chamber is set in the surface area so that the passing resistance from each filtration chamber into a water collecting route may be smaller as going remoter from the vicinity of a discharge port of the membrane element; and
a filtration membrane bonded linearly to at least one surface of the membrane element main body part at a peripheral edge and at the partition walls for filtering the water to be treated and for preventing filtered water from communicating between filtration chambers.

14. A membrane element in an immersion type membrane separation apparatus, being a membrane element of an immersion type membrane separation apparatus composed by bonding a peripheral edge of a filtration membrane to at least one surface of a membrane element main body part for filtering the water to be treated by the filtration membrane, wherein the filtration membrane is bonded linearly to the bonded surface of the membrane sheet of the membrane element main body part, and a bonded portion is formed in a lateral direction dividing vertically the inner side of the bonded peripheral edge of the filtration membrane, wherein the membrane element comprises a filtration chamber forming part arrayed by dividing filtration chambers into a plurality in a vertical direction and water collecting transverse groove forming parts forming transverse grooves for collecting filtered water from each filtration chamber in a lateral direction by connecting with the filtration chamber forming part, and the transverse grooves formed in the water collecting transverse groove forming part to communicate with each filtration chamber are formed to be smaller in the interval or larger in the groove sectional area as going remoter from the vicinity of the discharge port.

15. The membrane element in the immersion type membrane separation apparatus according to claim 14, wherein the membrane element further comprises a water collecting route by connecting with the water collecting transverse groove forming parts for collecting the water further in the lateral direction from each transverse groove and discharging to outside.

* * * * *